United States Patent
Gerber

[15] 3,658,049
[45] Apr. 25, 1972

[54] APPARATUS FOR ACCELERATING THE HEATING OF A COOKING VESSEL

[72] Inventor: Curtis E. Gerber, 1115 Twiggs St., Tampa, Fla. 33602

[22] Filed: Mar. 18, 1970

[21] Appl. No.: 20,656

[52] U.S. Cl. .................................................126/215
[51] Int. Cl. ........................................F24c 15/10
[58] Field of Search .........................126/215, 214 D

[56] References Cited

UNITED STATES PATENTS

| 1,353,265 | 9/1920 | Oshige | 126/215 |
| 611,376 | 9/1898 | Craig | 126/215 |
| 1,984,708 | 12/1934 | Surges | 126/214 D X |

FOREIGN PATENTS OR APPLICATIONS

| 842,489 | 3/1939 | France | 126/215 |
| 17,701 | 10/1916 | Great Britain | 126/215 |
| 972,980 | 9/1950 | France | 126/215 |

*Primary Examiner*—Charles J. Myhre
*Attorney*—Oltsch & Knoblock

[57] ABSTRACT

Apparatus for accelerating the heating of a cooking vessel positioned over a heat source including a sleeve adapted to surround the side wall of the cooking vessel. The sleeve includes an inner face which is spaced from the vessel side wall and is interrupted by a plurality of inwardly directed projections. The projections are spaced about the circumference of the sleeve inner face and are adapted to terminate adjacent the vessel side wall and to define in conjunction therewith a plurality of passages through which heat from the heat source may pass in intimate contact with the vessel side wall.

11 Claims, 12 Drawing Figures

PATENTED APR 25 1972

INVENTOR.
CURTIS E. GERBER

BY Oltsch & Knoblock

ATTORNEYS

INVENTOR.
CURTIS E. GERBER
BY Oltsch & Knoblock
ATTORNEYS

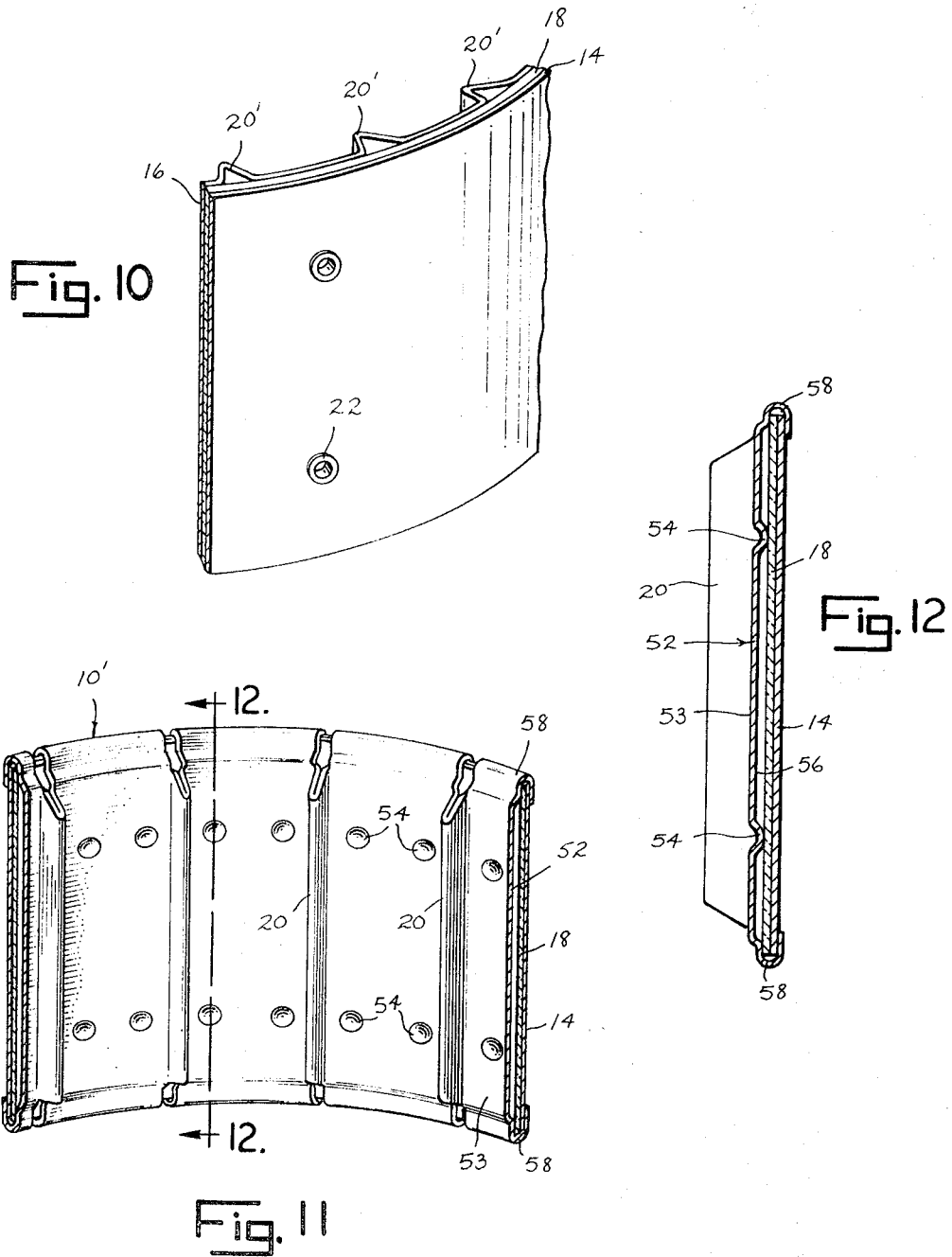

APPARATUS FOR ACCELERATING THE HEATING OF A COOKING VESSEL

SUMMARY OF THE INVENTION

This invention relates to apparatus for accelerating the heating of a cooking vessel which is positioned over a heat source and has particular application to the heating of pans on outdoor cooking stoves.

The apparatus of this invention includes a sleeve which surrounds the side wall of the cooking vessel. The inner face of the sleeve is spaced from the vessel side wall and is interrupted by a plurality of inwardly directed projections which are spaced about the circumference of the inner face. These projections are adapted to extend to and terminate adjacent the side wall of the cooking vessel and define in conjunction with the vessel and sleeve a plurality of passages through which heat from the heat source may pass in intimate contact with the vessel side wall. The sleeve is preferably split with the ends formed thereby connected by an adjustable connector so as to permit the sleeve to accommodate cooking vessels of different diameters.

Hangers may be connected to the inner face of the sleeve between projections to enable a cooking vessel, when the sleeve is rested on the upper grate of a stove, to be supported within the sleeve with the bottom thereof spaced from the stove grate. Additionally, the cooking vessel may be set upon the grate of the stove, and the sleeve positioned around the cooking vessel with the hangers thereof engaging the rim of the vessel and supporting the sleeve.

Accordingly, it is an object of this invention to provide a means which is used in associated with a cooking stove to accelerate the heating of a cooking vessel positioned upon the stove with no increase in the stove's fuel consumption.

Another object of this invention is to provide apparatus of economic construction which surrounds the side wall of a cooking vessel positioned upon a cooking stove so as to cause the heat emitted from the heat source of the stove to be collected and passed by the side wall of the cooking vessel in intimate contact therewith, thus accelerating the heating of the vessel.

Still another object of this invention is to provide means of simple construction and operation which can be used in conjunction with an outdoor camping stove to accelerate the heating of a cooking vessel thereon.

Other objects of this invention will become apparent upon a reading of the inention's description.

BRIEF DESCRIPTION OF THE DRAWINGS

FIG. 10 is a fragmentary perspective view of the side wall of the heat accelerator of this invention shown in another modified form.

FIG. 11 is a fragmentary perspective view of the side wall of the heat accelerator of this invention shown in another modified form.

FIG. 12 is a sectional view taken along line 12–12 of FIG. 11.

DESCRIPTION OF THE PREFERRED EMBODIMENTS

Figure 1:
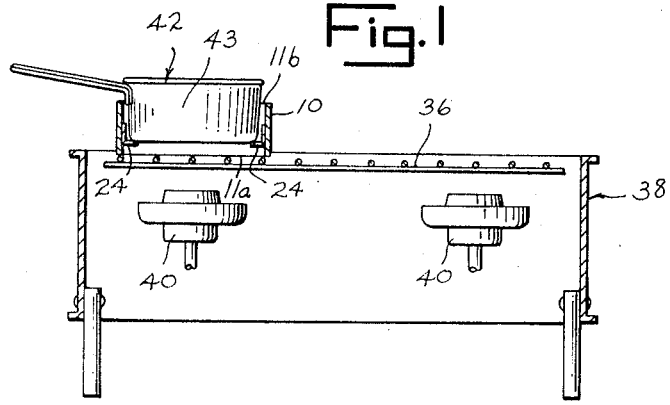
FIG. 1 is a sectional view of a camping stove with the heat accelerator of this invention shown in operation thereon.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Referring first to the embodiment illustrated in FIGS. 4–7, the heat accelerator so shown includes a split sleeve member 10 having the free ends 13 formed thereby interconnected by connector plate 12 which permits the expansion and retraction of the sleeve to accommodate cooking vessels of different diameters. Sleeve member 10 includes an outer band part 14, an inner band part 16, and insulative sheet 18 positioned between band parts 14 and 16. Band parts 14 and 16 are preferably constructed from stainless steel and insulative sheet 18 is preferably of an asbestos composition. The inner face 17 of band part 16 is interrupted by a plurality of projections 20, such as folds formed therein, which extend generally inwardly toward the center of the sleeve member. Projections 20 preferably extend transversely across inner face 17 of the band part and are preferably circumferentially spaced an equal distance apart. Band parts 14 and 16 and insulative sheet 18 are rigidly connected together by a plurality of rivets 22 circumferentially spaced about the sleeve member.

Figure 6:
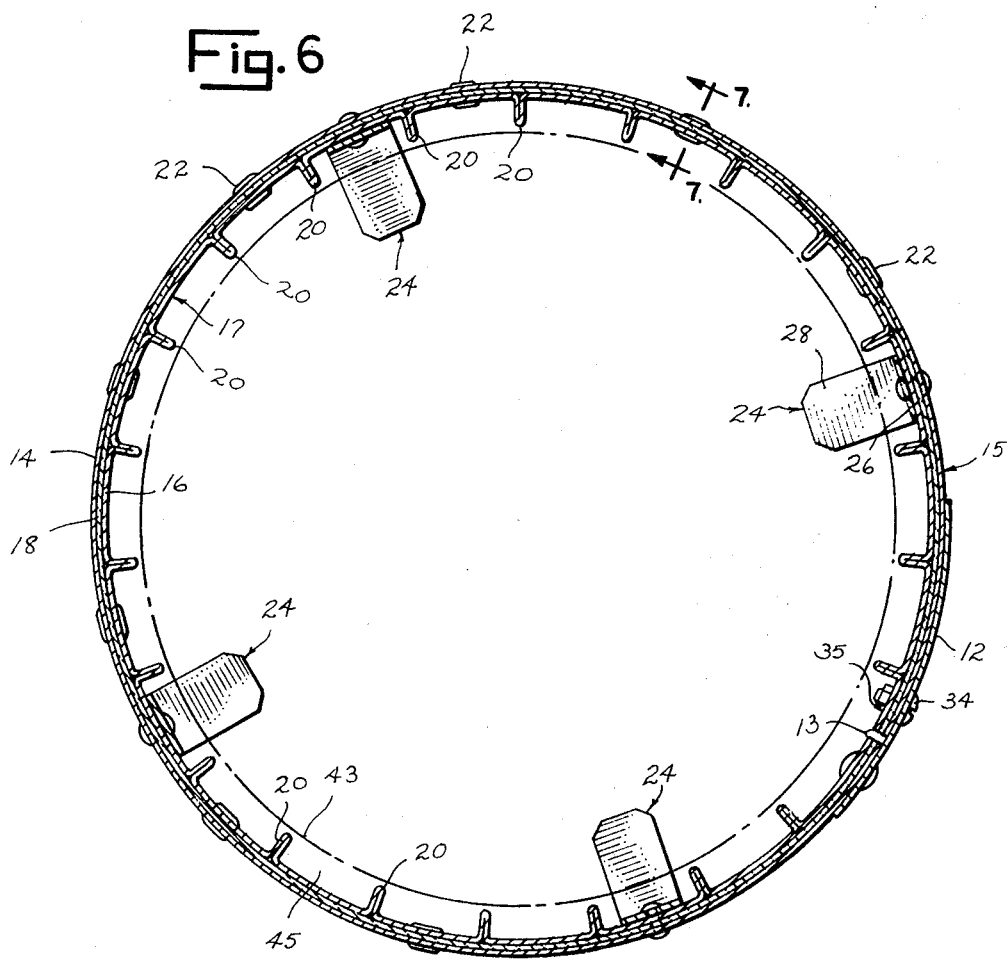
FIG. 6 is a sectional view taken along line 6—6 of FIG. 4.
Figure 7:
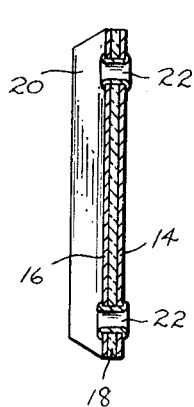
FIG. 7 is a cross sectional view taken along line 7—7 of FIG. 6.

Positioned circumferentially about the inner face 17 of band part 16 are a plurality of hanger plates 24. Each hanger plate 24 is L-shaped and has a leg 26 which is riveted or similarly attached to band part 16 and a base 28. There are preferably four such hanger plates attached to sleeve member 10. Hangers 24 are preferably generally equally spaced apart and positioned between projections 20 with the base 28 of each hanger plate projecting forwardly of the projections as best illustrated in FIG. 6. Bases 28 of the hanger plates 24 are preferably substantially coplanar and are located an equal distance from and generally closer to one marginal edge 11a than the other marginal edge 11b of the sleeve member.

Figure 5:
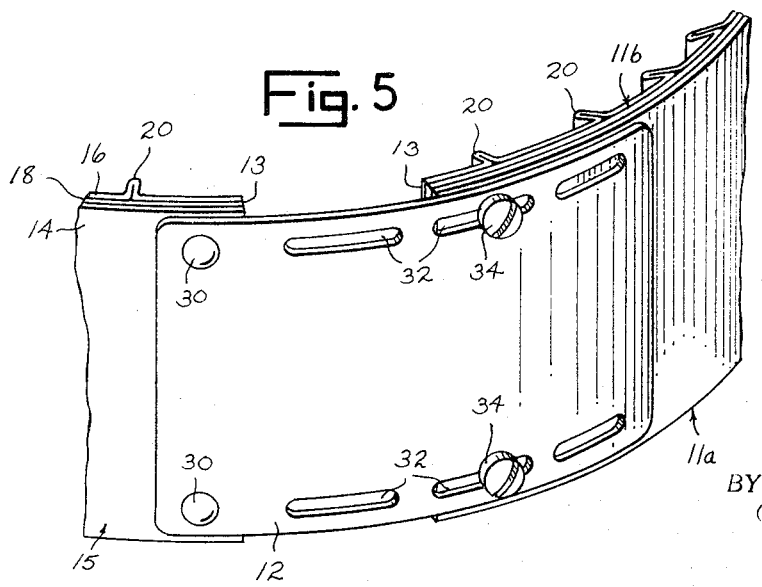
FIG. 5 is a fragmentary enlarged detail view of the heat accelerator shown in FIG. 4.

Connector plate 12 is positioned against the outer face 15 of sleeve member band part 14 and has one end rigidly attached, such as by rivets 30, to one end 13 of sleeve member 10. Connector plate 12 is preferably substantially the same width as sleeve member 10 and includes at the upper and lower margins thereof a plurality of slots 32 extending longitudinally of the connector plate. A pair of adjustment screws 34 are turned into the band parts of sleeve member 10 at the other end 13 thereof. Each adjustment screw 34 is positioned adjacent a marginal edge of the sleeve member and extends through a selected slot 32 of connector plate 12 so that when turned into the sleeve member and tightened against the connector plate by nut 35, ends 13 of the sleeve member will be held in a selected spaced relationship as illustrated in FIG. 5.

In FIG. 1, the heat accelerator illustrated in FIGS. 4–7 and just described is shown with its marginal edge 11a resting upon grate 36 of a camping stove 38 having burners 40 serving as heat sources. The heat accelerator is centered over a burner 40 and a cooking vessel, such as a pan 42, is seated within sleeve member 10 with the bottom wall of the vessel being supported by bases 28 of hanger plates 24 in a spaced relationship from grate 36. Sleeve member 10 surrounds the side wall 43 of vessel 42 with projections 20 thereof being positioned adjacent the vessel side wall so as to form in conjunction therewith a plurality of circumferentially spaced passages through which the heat from burner 40 may pass in heat transfering contact with the side of the vessel. Thus, as shown in FIG. 6, each such heat passage 45 will be defined by two adjacent projections 20, the interconnecting portion of inner band part 16, and the side wall 43 of vessel 42 which is represented by broken lines. It is not necessary that projections 20 actually touch the vessel side wall. Also sleeve member 10 may contain a slot to accommodate the handle of the cooking vessel.

Figure 2:
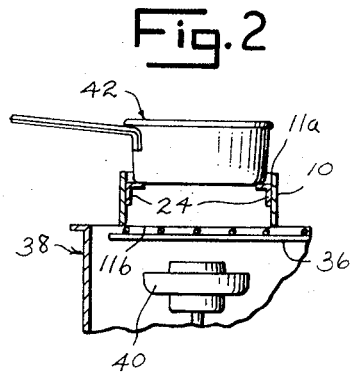
FIG. 2 is a fragmentary sectional view of the camping stove of FIG. 1 with the heat accelerator of this invention shown in an alternative manner of operation.
Figure 4:
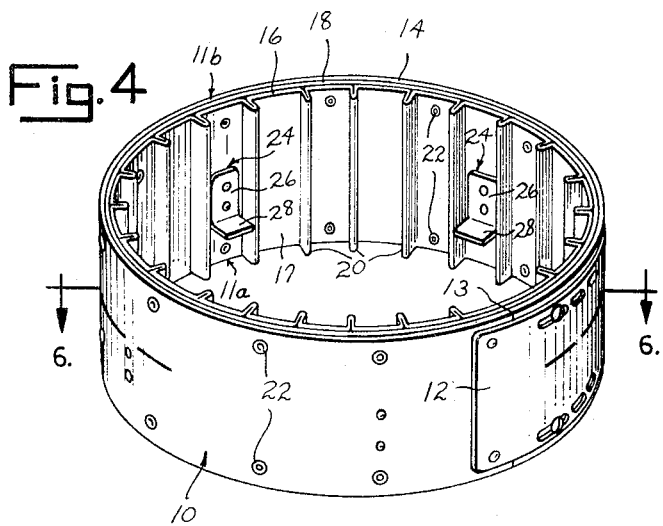
FIG. 4 is a perspective view of the heat accelerator of this invention.
Figure 3:
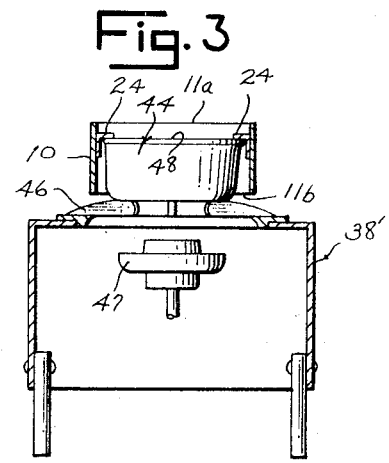
FIG. 3 is a sectional view of another type camping stove with the heat accelerator of this invention shown in operation thereon.

FIGS. 2 and 3 illustrate alternative ways of using the heat accelerator above described. In FIG. 2, sleeve member 10 has its marginal edge 11b resting on grate 36 of stove 38 with cooking vessel 42 being supported upon hanger plates 24 and projecting above marginal edge 11a. In FIG. 3, a handleless cooking vessel 44 rests upon a radial-flanged burner grate 46 positioned over a gas burner 47 of a cooking stove 38'. Sleeve member 10 surrounds vessel 44 with hanger plates 24 thereof engaging the upper margin 48 of the vessel so as to cause the sleeve member to be supported by the vessel with its lower marginal edge being slightly spaced from grate 46 of the stove as shown.

Figure 8:
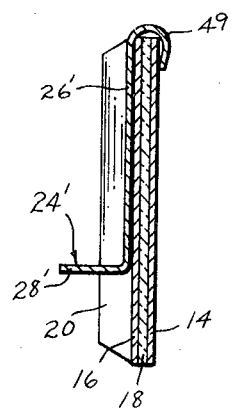
FIG. 8 is a cross sectional view of the side wall of the heat accelerator shown in FIG. 4 with a modified type hanger attached thereto for supporting a cooking vessel.

FIG. 8 is a cross sectional view of the heat accelerator sleeve member 10 illustrated in FIGS. 4-7 taken through a hanger plate 24' of modified construction. Hanger plate 24' is of the removable type, being preferably formed from a metal strip or wire, and has a base 28' and an upwardly extending leg 26' which terminates in a downturned hook part 49. Each hanger plate 24' is attached to sleeve member 10 by having its hook part 49 hooked over either marginal edge 11a or 11b of the sleeve member.

Figure 9:
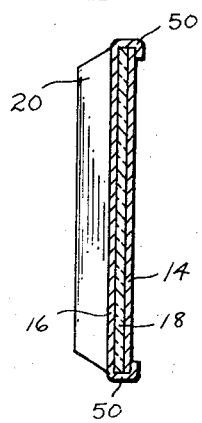
FIG. 9 is a cross sectional view of the side wall of the heat accelerator of this invention shown in modified form.

FIG. 9 is illustrative of a modified form of sleeve member 10 in which inner band part 16 includes marginal edge portions 50 which are bent over insulative sheet 18 and outer band part 14 as shown. In this embodiment the band parts 14 and 16 and insulative sheet 18 of the sleeve member are attached together without the use of rivets or other similar attachment means. In FIG. 10 inner band part 16 of the sleeve member 10 is modified to define V-shaped projections 20' instead of the flat fin-like projections 20 illustrated in FIGS. 4-6.

FIGS. 11 and 12 are illustrative of another modified form of the sleeve member 10. This embodiment is designated sleeve member 10'. The inner band part 52 of sleeve member 10' includes a plurality of inwardly directed transverse projections 20 which are preferably equally spaced about the circumference of the inner face 53 of the inner band part and a plurality of circumferentially spaced pimples 54, or like protrusions, formed at the outer face 56 of the inner band part. Pimples 54 contact insulation sheet 18 and serve to space face 56 of inner band part 52 from the insulation sheet and thus provide an insulative air space between the inner band part and the insulative sheet when sleeve member 10' is assembled. Inner band part 52 includes upper and lower marginal parts 58 which are bent over the upper and lower marginal edges of insulative sheet 18 and outer band part 14 and which serve to attach band parts 14 and 52 and insulative sheet 18 together as best shown in FIG. 12. Either the hanger plates 24 shown in FIGS. 4-6, or the hanger plate 24' shown in FIG. 8 may be utilized with sleeve member 10'.

The heat accelerator device of this invention permits sufficient air to be supplied to the burner or heat source over which the cooking vessel is placed so as to provide for adequate fuel combustion and yet insulates the cooking vessel from side drafts which normally cause the dissipation of the cooking heat as it passes along the sides of the vessel. When utilizing the heat accelerator of this invention, the cooking heat from the burner is directed through passages, defined by the side wall of the cooking vessel and the sleeve member, along the vessel side wall so that the vessel can absorb a maximum amount of the heat and thereby cause a reduction in the cooking time. It has been found that water which was brought to boiling in 19½ minutes at a 60° temperature in the presence of a 4 m.p.h. wind without the use of the heat accelerator of this invention can be brought to a boil in 3½ minutes under the same climatic conditions and with the same amount of burner heat output with the aid of the heat accelerator.

It is to be understood that the invention is not to be limited to the details herein given, but may be modified within the scope of the appended claims.

What I claim is:

1. Apparatus for accelerating the heating of a cooking vessel positioned over a heat source comprising: a sleeve adapted to surround the side wall of said vessel and including spaced annular marginal edges, said sleeve having inner and outer cylindrical band parts and an insulative member disposed between said band parts, said inner band part having an inner face adapted to oppose said vessel side wall and an outer face opposing said insulative member, said band parts and insulative member being substantially coextensive, said inner band part including means constituting spaced parallel projections and defining circumferentially narrow uninterrupted heat flow passages extending along said inner face of the inner band part from one said marginal edge to the other said marginal edge of the sleeve, said projections being aligned with the axis of said inner band part and being adapted to project outwardly from said inner face of the inner band part to adjacent said vessel side wall so as to define in conjunction with said vessel side wall said heat flow passages through which the heat from said heat source may pass in heat transferring contact with said vessel side wall when said sleeve surrounds said vessel side wall.

2. The apparatus of claim 1, wherein said projections extend from adjacent one said marginal edge to adjacent the other said marginal edge.

3. The apparatus of claim 2, wherein said projections are equally spaced apart.

4. The apparatus of claim 1 wherein said sleeve is split so as to be expansible.

5. The apparatus of claim 4, including adjustable means interconnecting the split-defining ends of said sleeve for varying the spacing between said ends to accommodate vessels of different sizes.

6. The apparatus of claim 1, wherein said insulative member is spaced from one of said band parts.

7. The apparatus of claim 1, wherein said insulating member is positioned adjacent said outer band part, said projections extending outwardly from said band part inner face, a plurality of circumferentially spaced protrusions extending outwardly from said band part outer face and contacting said insulating member to cause said inner band part to be spaced from said insulating member.

8. The apparatus of claim 1, including support means carried by said sleeve at said inner face, said support means having parts projecting toward the center of said sleeve adapted to engage said vessel when surrounded by said sleeve for supporting one of said sleeve and vessel relative to the other.

9. The apparatus of claim 8, wherein said support means comprise a plurality of hanger members each having a generally horizontal base which projects inwardly toward the center of said sleeve and beyond said projections, said hanger members spaced circumferentially about said inner face with the bases thereof lying in substantially the same plane.

10. The apparatus of claim 9, wherein said sleeve includes upper and lower marginal edges and said hanger members are L-shaped and include generally vertical leg parts, each vertical leg part having said generally horizontal base at one end thereof and a downturned hook portion at its opposite end, said hook portion received over the upper marginal edge of said sleeve.

11. Apparatus for accelerating the heating of a cooking vessel positioned over a heat source and having a side wall comprising: a sleeve surrounding said vessel side wall, said sleeve having inner and outer cylindrical band parts and an insulative member disposed between said band parts, said band parts and insulative member being substantially coextensive, said inner band part having an outer face contacting said insulative member and an inner face interrupted by at least ten elongated projections paralleling the axis of said inner band part, said projections being substantially equally spaced about the circumference of said inner face and extending to adjacent said vessel side wall, said inner face defining in conjunction with said vessel side wall and projections a plurality of uninterrupted passages between said vessel side wall and said inner band through which heat from said heat source may pass in heat transferring contact with said vessel side wall.

* * * * *